United States Patent [19]

Suzuki et al.

[11] Patent Number: 5,345,157
[45] Date of Patent: Sep. 6, 1994

[54] ACTUATOR FOR AN ACCELERATOR FOR ENGINE CONTROL VALVE CONTROL AND THE LIKE

[75] Inventors: Kazuhiro Suzuki, Nishinomiya; Masatoshi Miki; Toshio Kuwabara, both of Kobe; Morihiko Matsubara, Hyogo, all of Japan

[73] Assignees: Nippon Cable System, Inc., Takarazuka; Shin Caterpillar Mitsubishi Ltd., Tokyo, both of Japan

[21] Appl. No.: 1,294

[22] Filed: Jan. 6, 1993

[51] Int. Cl.$^5$ .................................. F02D 9/00
[52] U.S. Cl. ..................... 318/280; 123/400; 123/342
[58] Field of Search ............... 318/280–286, 318/293, 256, 54, 65, 560; 206/61.89, 61.58 R, 61.54; 123/342, 400, 399; 180/178

[56] References Cited

U.S. PATENT DOCUMENTS

| | | | |
|---|---|---|---|
| 3,969,615 | 7/1976 | Bowers et al. | 318/280 X |
| 4,223,254 | 9/1980 | Adams | 318/280 |
| 4,631,460 | 12/1986 | Reichmann | 318/280 |
| 4,881,018 | 11/1989 | Kato et al. | 318/280 X |
| 4,950,965 | 8/1990 | Kenny et al. | 123/400 X |
| 5,067,576 | 11/1991 | Bober | 180/178 X |
| 5,199,401 | 4/1993 | O'Neill et al. | 123/342 |
| 5,215,057 | 6/1993 | Sato et al. | 123/400 |

*Primary Examiner*—Jonathan Wysocki
*Attorney, Agent, or Firm*—Armstrong, Westerman, Hattori, McLeland & Naughton

[57] ABSTRACT

An actuator for an accelarator includes a casing and a driving part having a reversibly revolvable motor disposed in the casing, a decelerator for decelerating revolution of the motor, and an output pulley, connected to the decelerator, for taking up or letting out a control cable cable. The actuator also includes a control part composed of an operation part, and a control mechanism for controlling the revolution of the motor on the basis of a deviation between a position of the operation part and a position of the output part, wherein the driving part and the control part are integrally coaxially connected to each other.

6 Claims, 7 Drawing Sheets

ACTUATOR FOR AN ACCELERATOR FOR ENGINE CONTROL VALVE CONTROL AND THE LIKE

BACKGROUND OF THE INVENTION

The present invention relates to an actuator for an accelerator (hereinafter refereed to as an "actuator" simply), and more particularly, to an actuator for remotely controlling such a speed governor by automatically regulating a degree of opening to be used for a Diesel engine or the like, for example, in construction equipment. The actuator of the present invention can be utilized for various purposes such as for controlling a valve as well as an engine.

Conventionally, construction equipment such as a power shovel has a function of automatic deceleration or of programmed driving adapted for operations needed.

Figure 8:
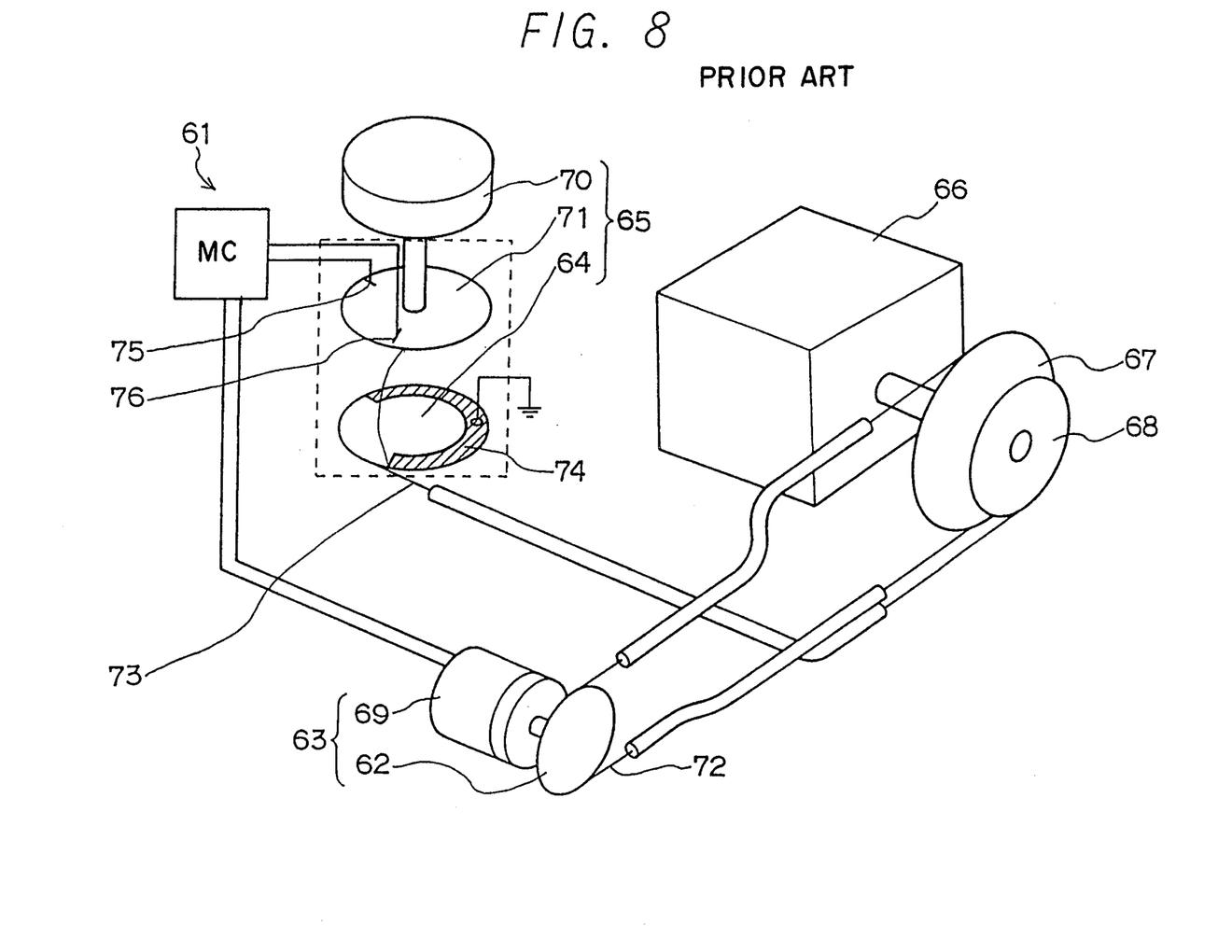
FIG. 8 is a schematic perspective view showing an example of a conventional actuator.

As shown in FIG. 8, an actuator 61 of a conventional type comprises a driving part 63 having an output pulley 62 and a control part 65 having a feed-back pulley 64 which are separately provided. For that reason, an engine speed governor 66 is provided with a small pulley 68 as well as an engine pulley 67. Numeral 69 denotes a motor, numeral 70 denotes an operation dial, and numeral 71 denotes a terminal board which connects to the operation dial 70. The output pulley 62 and the engine pulley 67 are connected each other by means of a control cable 72, on the other hand the feed-back pulley 64 and the small pulley 68 are connected each other by means of a feed-back cable 73. An electrode plate 74 is mounted on the feed-back pulley 64, and a terminal 75 for acceleration and a terminal 76 for deceleration are provided on the terminal board 72 and which are adapted to come into slidable contact with the electrode plate 74. Operation of the motor is effected via motor control means MC.

With the conventional actuator 61 thus arranged, when the operation dial 70 is turned to set to a certain angle, and if there is a deviation between the angle set by the operation dial 70 and the angle through which the feed-back pulley 64 rotates in response to the setting by the operation dial 70, the motor 69 revolves, responsive to an output signal corresponding to the deviation, in such a direction as to offset the deviation. Whereupon, the motor 69 causes, through the output pulley 62 and control cable 72, the engine pulley 67 to rotate. As the engine pulley 67 rotates, the rotation angle thereof is transmitted through the feed-back cable 73 to the feed-back pulley 64. Such an operation is continued until the deviation is nulled. Thus, opening of the speed governor is controlled so as to adjust the rotating speed of the engine to a desired value eventually.

As described above, the conventional actuator 61 for use in an acceleration control device comprises the driving part 63 and the control part 65 separately. Accordingly, it is difficult to down-scale the actuator 61, hence desired time and labor for mounting it on a machine body. This leads to an the increase in the production cost of the actuator.

The present invention has been attained to overcome such problems. Thus, it is an object of the present invention to provide a down-scaled and simplified actuator.

SUMMARY OF THE INVENTION

According to the present invention, there is provided an actuator for accelerator comprising:
 (a) a casing;
 (b) a driving part comprising a reversibly revolvable motor disposed in the casing, a speed reducer for reducing revolution of the motor, and an output pulley, connected to the speed reducer, for winding up or letting out a control cable; and
 (c) a control part comprising an operation part, and a control mechanism for controlling the revolution of the motor depending on a deviation between a position of the operation part and a position of the output pulley wherein the driving part and the control part are integrally coaxially connected to each other.

In the present invention, the driving part preferably comprises the motor, a first speed reducer speed reducer connected to an output shaft of the motor, a second decelerator connected to an output part of the first speed reducer, and the output pulley disposed in an output part of the second speed reducer.

In this case, the second decelerator is preferably a sun and planet gear decelerator comprising a sun gear connected to the output part of the first decelerator, a plurality of planetary gears disposed around and engaged with the sun gear, and an internal gear circumferentially engaged with the planetary gears and integrated with a lower portion of the output pulley, wherein a shaft of each of the planetary gears is supported at its lower end by the casing while being journalled at its upper end by a bearing member; and the bearing member is free from any of the members other than the shaft of the planetary gear.

On the other side, the control part preferably comprises a board mounted on its lower face with a terminal for forward revolution of the motor and a terminal for backward revolution thereof, an operation shaft, projecting from the board, for rotating the board, and an electrode plate fixed to the output shaft of the second decelerator so as to face opposite to a bottom face of the board,
 the board and the electrode plate being disposed in the control mechanism so as to make the two terminals being slidably contacted with the electrode plate;
 the output shaft of the second decelerator being loosely fitted into a hole formed centrally on the bottom face of the board.

Further, preferably the control mechanism is arranged such that a common terminal is secured to the electrode plate so as to allow the electrode plate to be conducted through a conductive wire and the common terminal.

Still further, more preferably the control mechanism has an insulating plate disposed on the board thereby separating the upper compartment of the board from the lower compartment thereof, on which insulating plate are provided wires respectively connecting to the terminal for forward revolution of the motor and the terminal for backward revolution thereof.

In the actuator of the present invention, when the operation part is turned through a certain angle corresponding to a desired speed governor opening of an engine and there occurs a deviation between a rotation angle of the output pulley and the angle set by the operation part, the control mechanism causes the motor of the driving part to revolve in such amount and direction as to offset the deviation. This revolution of the motor is transmitted through the decelerator to rotate the output pulley. The rotation of the output pulley causes the control cable to operate so as to rotate the engine, pulley connected to the speed governor of the engine, thereby adjusting the speed governor opening.

DETAILED DESCRIPTION

Now, the present invention will be described with reference to the drawings.

Figure 1:
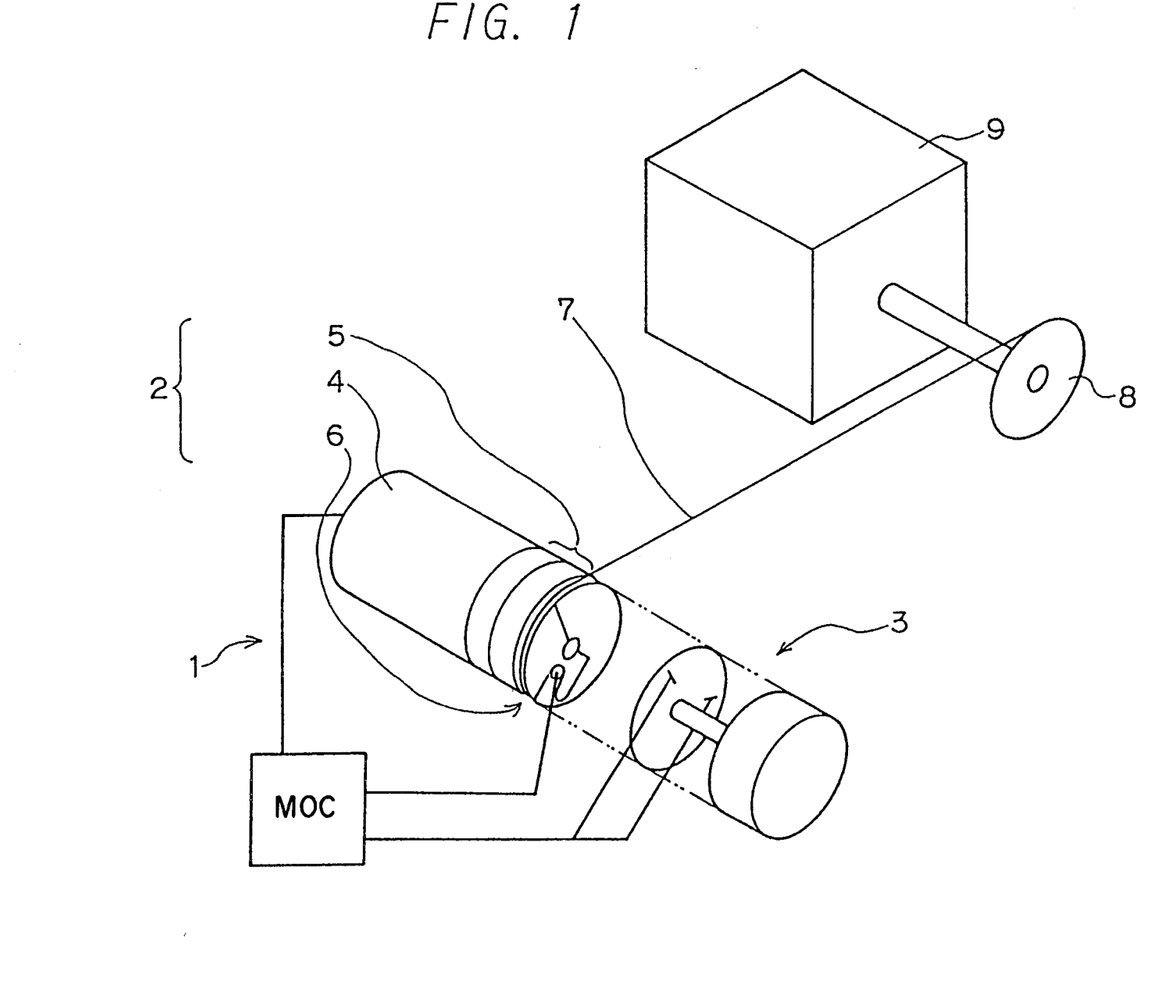
FIG. 1 is a schematic perspective view showing an engine control device provided with an actuator embodying the present invention.

Referring to FIG. 1, an actuator 1 comprises a driving part 2 and a control part 3 which are coaxially and integrally assembled. The driving part 2 comprises a motor 4, a deceleration part 5, and an output pulley 6 formed integrally with the deceleration part 5 on the output side thereof. The output pulley 6 connects to an engine pulley 8 through a control cable 7 (hereinafter referred to as "cable"). Rotation of the output pulley 6 would cause the engine pulley 8 to rotate by means of the cable 7, thereby to open or close a speed governor 9 connected to the engine pulley 8. Operation of the motor 4 is effected via motor operation control means MOC, which can be performed by means shown in FIG. 7 and discussed herein-below.

Figure 2:
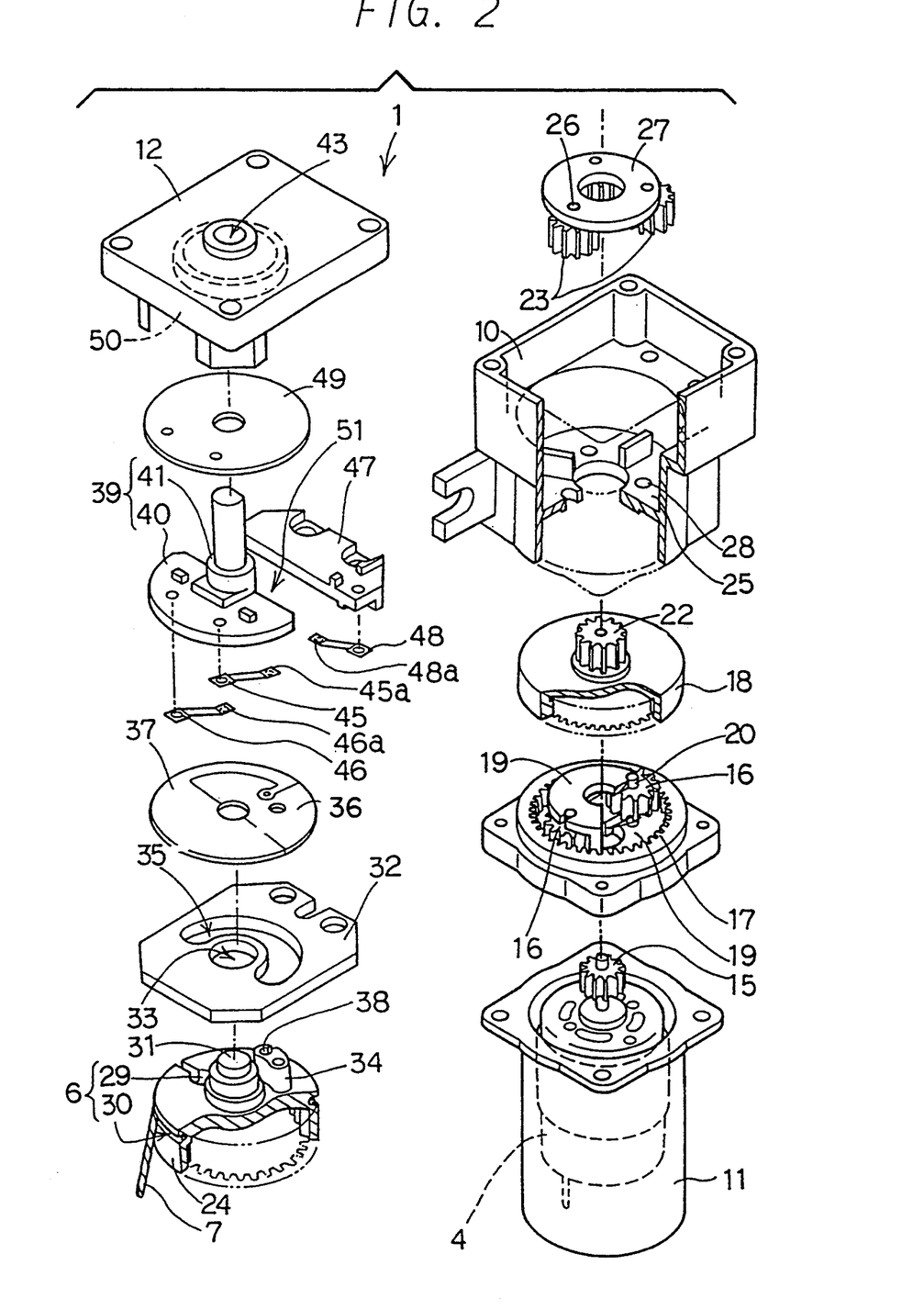
FIG. 2 is a perspective view showing the actuator of FIG. 1 prior to assemblage.
Figure 3:
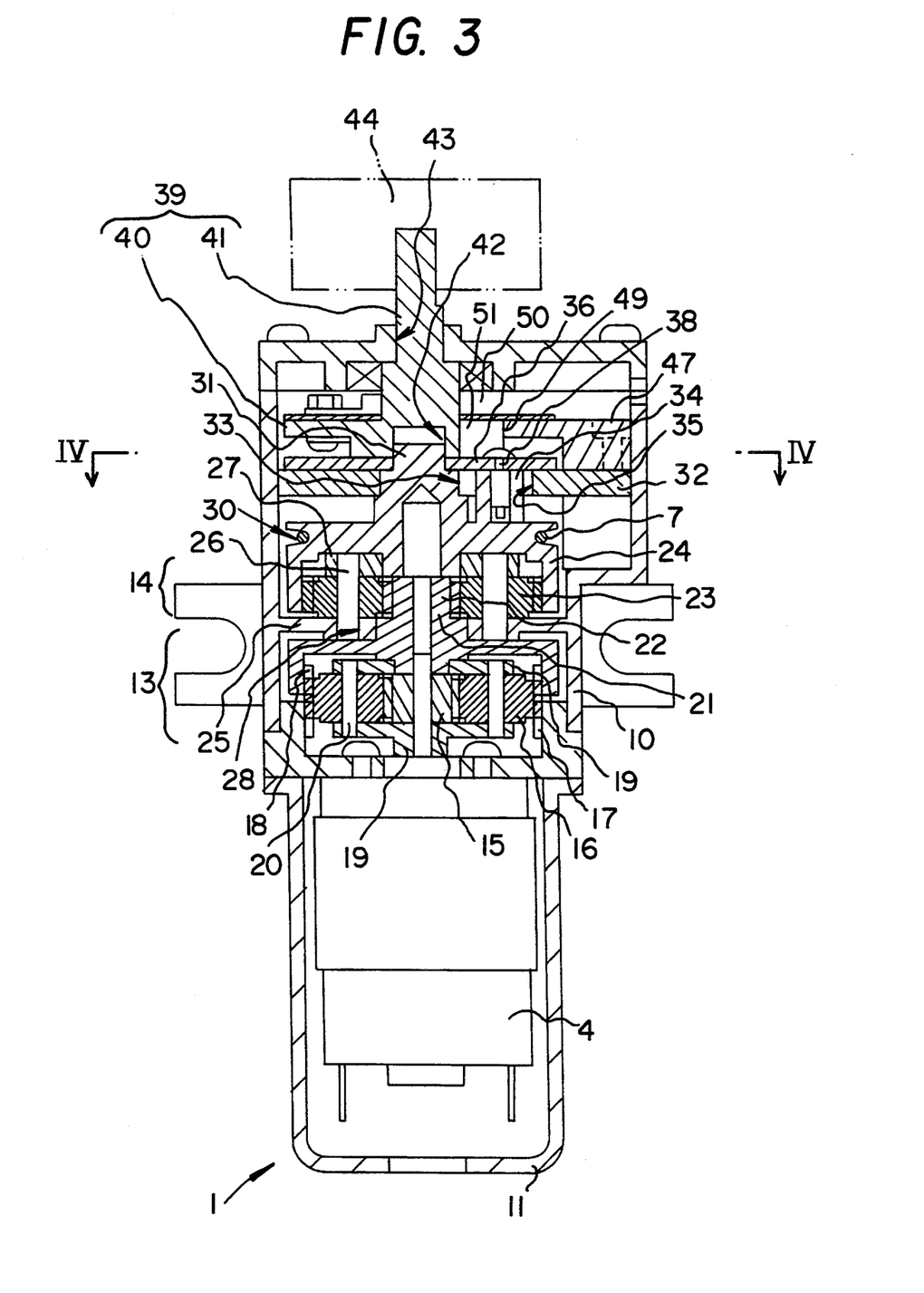
FIG. 3 is a vertical sectional view showing the actuator of FIG. 1.

Referring to FIGS. 2 and 3 which illustrate the actuator 1 in detail, denotes numeral 10 a casing, numeral 11 denotes a motor housing, and numeral 12 denotes a lid member. These three members (the casing 10, the motor 11, and the lid 12) cooperate to accommodate the driving part 2 and the control part 3. The casing 10 is shaped rectangular parallelepiped in the upper portion thereof while cylindrical in the lower portion.

To be described first is the driving part 2.

The deceleration part 5 comprises a first decelerator 13 of Fergusson's paradox gear type and a second decelerator 14. The first decelerator 13 comprises a sun gear 15 fixed to the shaft of the motor 4, two planetary gears 16 disposed around and engaged with the sun gear 15, a fixed internal gear 17 and a rotatable internal gear 18, the gears 17 and 18 facing opposite to each other and engaging with the planetary gears 16. The fixed internal gear 17 is supported between the motor 4 and the casing 10, while on the other hand the rotatable internal gear 18 forming the output part of the first decelerator 13 is rotatably guided along the inner periphery of the casing 10. The planetary gears 16 are each rotatably supported by a pin 20 extending between a pair of vertically opposite carriers shaped substantially annular. As the sun gear is rotated, each of the planetary gears 16 rotates around its own axis while revolving around the sun gear 15 together with the carriers 19. The internal gears 17 and 18 are slightly different from each other in the number of gear teeth. Hence, the revolution of the motor 4 is greatly reduced by the rotatable internal gear 18 and outputted for use.

The second decelerator 14 comprises: a sun gear 22 formed on a first shaft 21 which is projected on the center of the rotatable internal gear 18; three pieces of planetary gears 23 disposed around and engaged with the sun gear 22 each other; and an internal gear 24 being engaged with the planetary gears 23. The planetary gear 23 are disposed on the upper face of an annular-like-shaped partition plate 25 formed on an inner periphery of the casing 10 so as to be directed toward a center (an imaginary axis) of the thrust shaft 21. An annular bearing 27 which has three pins 26 projecting therefrom, corresponding to the planetary gears 23 and inserting into center bores of the respective planetarry gears 23, and each pins 26 is inserted into respective bearing holes 28 formed in the partition plate 25. Since the three planetary gears 23 are carried with the single and removable bearing 27 which is so to speak a "floating bearing", the output part of the second decelerator formed integrally with the internal gear 24 can be readily assembled with the planetary gears 23.

The internal gear 24 is integrally formed at a top portion thereof with the output pulley 6. Specifically, in the top face of the internal gear 24 is formed a fixing hole 29 for fixing one end of the cable 7, while in the outer peripheral face thereof is formed a groove 30, which communicates with the fixing hole 29, for winding the cable 7 therearound. A stepped shaft 31 having different diameters projects from the center of the top face of the output pulley 6 and is journalled in a bearing bore 33 of a guide panel 32 secured within the casing 10. The top face of the output pulley 6 is also formed with a projection 34 which is adapted to loosely fit into a guide groove 35 formed in the guide panel 32 for confining a rotation angle of the output pulley 6.

To be described in turn is the control part 3. The top portion of the joggled shaft 31, which projects upwardly from the guide panel 32, is fitted into a circular electrode plate 36. On the top face of the electrode plate 36 is formed an electrically conductive portion 37 composed of a sector-like-shaped portion of which the central angle is slightly smaller than 180° and a peripheral part which is indiscrete with the sector-like-shaped portion. The electrode plate 36 is pin-joined at a point spaced apart from the center thereof with the projection 34. Thus, the output pulley 6 and the electrode plate 36 are adapted to rotate together. A common terminal 38 inserted into and secured to the projection 34 is brought into direct contact with the electrically conductive portion 37 of the electrode plate 36 without using a brush. Since current flows directly to the electrically conductive portion 37 by means of a conductive wire, the structure of the control part 3 is simplified.

On the top face of the electrode plate 36 is rotatably disposed a movable terminal board 39. The movable terminal board 39 comprises a substantially semicircular board 40 and an operation shaft 41 projecting from the top face of the board 40. In the bottom face thereof is formed a fitting hole 42 coaxially with the operation shaft 41 into which the top end of the joggled shaft 31 is rotatably fitted. On the other hand, the operation shaft 41 projects to the outside of the lid member 12 through a hole 43 formed in the lid member 12 and is adapted to be mounted with an operation dial 44. On the bottom face of the board 40 are attached a brush terminal 45 for forward revolution of the motor 4 (hereinafter called "forward terminal") and a brush terminal 46 for backward revolution thereof (hereinafter called "backward terminal") which come into slidable contact with the electrode plate 36. As opposed to the semicircular board 40 and slightly spaced apart therefrom with intervention of the operation shaft 41, provided is a board 47 for auto-deceleration terminal (hereinafter called "deceleration terminal board") which is fixed within the casing 10 and attached with a brush terminal for auto-deceleration (hereinafter called "auto-deceleration terminal"). Like the terminals 45 and 46, the auto-deceleration terminal 48 comes into slidable contact with the electrode plate 36. On the top face of the board 40 is mounted a circular-shaped-insulating plate 49 extending over the deceleration terminal board 47. This insulating plate 49 serves to prevent wires in an upper space 50 from entering a lower space 51 to contact with and wind around the output pulley 6, hinder the rotation thereof or cause a short circuit with the electrode plate 36.

The operation of the actuator 1 thus constructed is to be described with reference to FIGS. 4 to 6.

Figure 4:
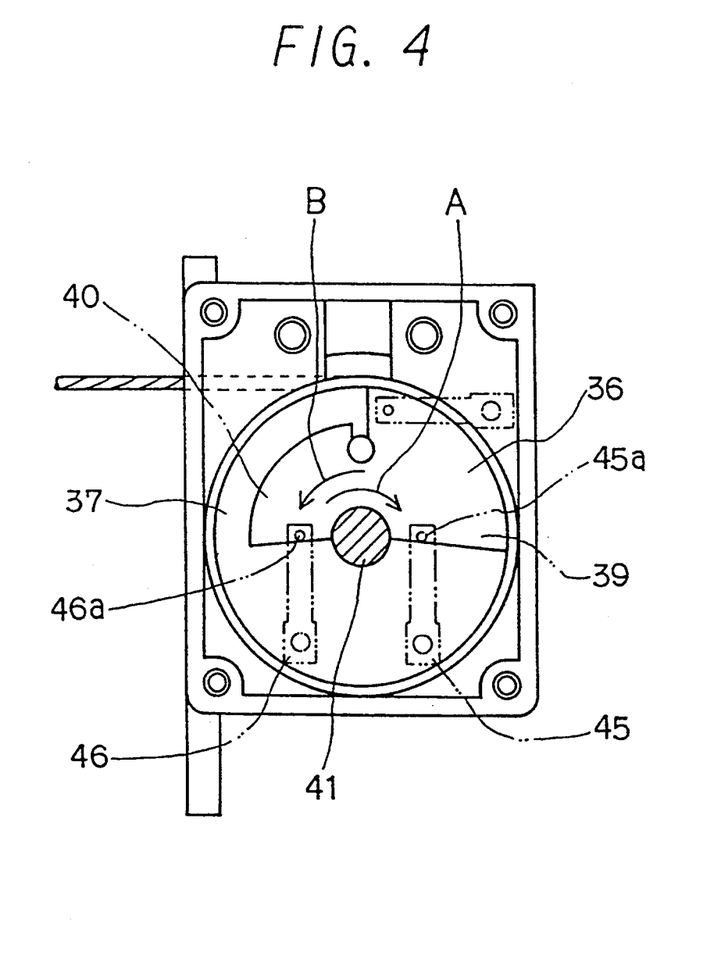
FIG. 4 is a sectional view taken along line IV—IV in FIG. 3.

FIG. 4 illustrates a relative positional relation among the electrode plate 36, the semicircular board 40 of the movable terminal board 39 and the deceleration terminal board 47. A contact point 45a of the forward terminal 45 and a contact point 46a of the backward terminal 46 are positioned on an imajed line passing through the center of the board 40 such that the center is interposed between the contact point 45a and 46b, or of the electrode plate 26. On the other hand, the electrically conductive portion 37 of the electrode plate 36 has a sector portion of which the central angle is slightly smaller than 180° as described above. Accordingly, the contact points 45a and 46b are both positioned barely deviating from the electrically conductive portion 37. When the operation shaft 41 is rotated with the operation dial 44, the board 40 which is formed integrally with the operation shaft 41 is also rotated so that the forward terminal 45 and the backward terminal 46 revolve together. For example, rotating the operation shaft 41 in the direction of arrow A causes the two terminals 45 and 46 to move to the respective positions shown in FIG. 5, so that the contact point 45a of the forward terminal 45 comes in contact with the electrically conductive portion 37. Then, the motor 4 in the driving part 2 revolves the forward direction, in which causes the output pulley 6 to rotate in a direction such as to pull the cable 7 with the deceleration part 5. Thereby, an opening of the speed governor 9 is controlled so that a plenty of fuel can flow into the engine, hence in an increase in a rotating speed of the engine. Then, the electrode plate 36 fixed to the output pulley 6 is also rotated together with the output pulley 6 in the direction of arrow A. Accordingly, rotation of the electrode plate 36 through a certain angle causes the contact point 45a of the forward terminal 45 to deviate from the electrically conductive portion 37 thereby stopping the motor 4 (see FIG. 6). That is, the relative positional relation among the electrically conductive portion 37 and the two terminals 45 and 46 comes to assume the same state as the initial state (see FIG. 4).

Figure 5:
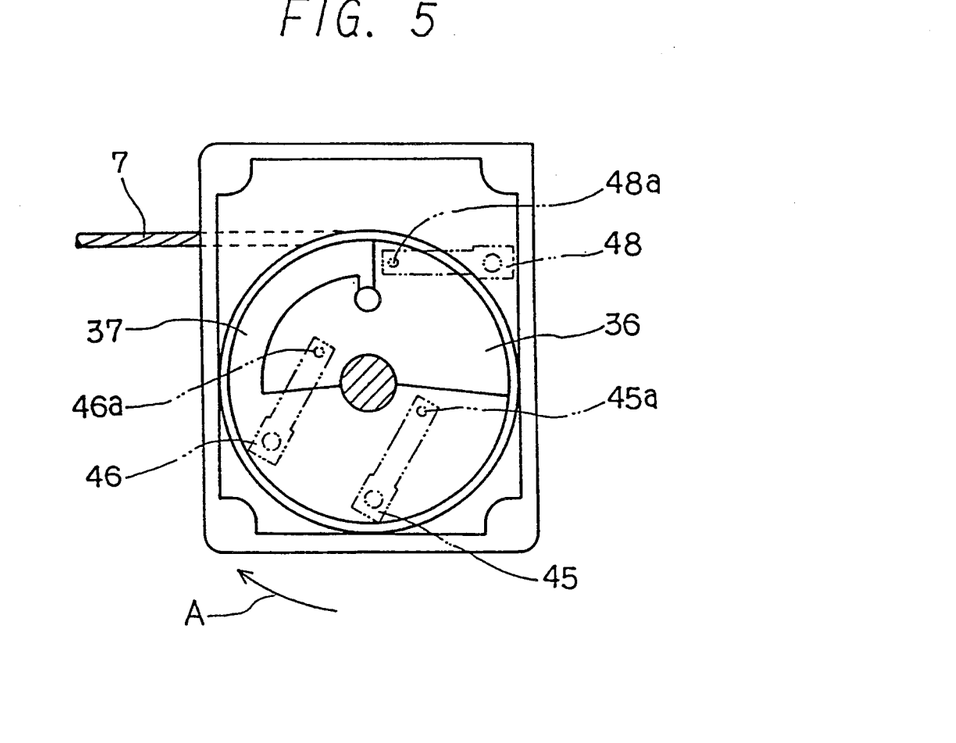
FIGS. 5 and 6 are each an explanatory view for illustrating an operation of the actuator of FIG. 1.
Figure 6:
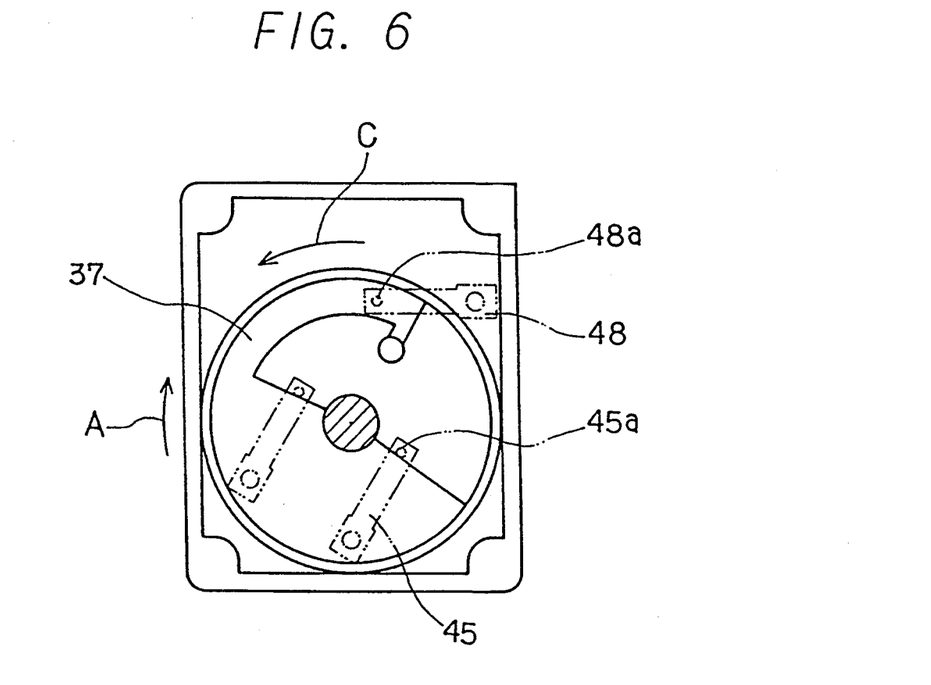

In other words, as is clear from FIGS. 4 to 6, the output pulley 6 is made to rotate through an angle substantially the same as the rotation angle of the operation dial 44. It should be understood that rotating the operation shaft 41 in the direction of arrow B in FIG. causes the two terminals 45 and 46 to revolve in the direction B in the same manner as above. In cooperation therewith, the output pulley 6 and the electrically conductive portion 37 rotate in the direction B, whereby the opening of the speed governor 9 is reduced in correspondence with the rotation angle of the operation shaft 41, so that the number of revolutions of the engine is made to decrease. Thus, the opening of the speed governor 9 is adjusted with the operation dial 44.

To be described next is an automatic deceleration mode.

If an operator leaves the operator's seat temporarily when his or her machine is driven in the normal driving mode the machine is made to drive in an automatic deceleration mode ( or standby driving mode: about 1500 rpm) by pushing an auto-deceleration button D (see FIG. 7) to be described later. Although the electrically conductive portion 37 is made in contact with a contact point 48a of the deceleration terminal 48 in FIG. 6, the circuit of the deceleration terminal 48 is opened usually. Then, the circuit of the deceleration terminal 48 is dosed by operating the auto-deceleration button. Accordingly, the automatically decelerated driving is performed only when the peripheral part of the electrically conductive portion 37 is in contact with the contact point 48a of the deceleration terminal 48 as shown in FIG. 6 the circuit is dosed. In other words, if the angle through which the output pulley 6 rotates is larger than the predetermined angle at which the contact point 48a of the deceleration terminal 48 is positioned, or if the opening of the speed governor is actually larger than that of the speed governor which is set to the value of the automatic deceleration mode, electric conduction occurs between the deceleration terminal 48 and the electric conductive portion 37 to revolve the motor 4. Thereafter, when the electrode plate 36 rotates in the direction of arrow C in FIG. 6 and the contact point 48a comes out of the electrically conductive portion 37, the motor 4 is made to stop. The rotating speed of the engine in the automatic deceleration mode (for example, about 1500 rpm) is determined depending on the opening of the speed governor corresponding to the position of the deceleration terminal 48 upon that stoppage of the motor 4. Since the rotation angle of the operation dial 44 is not changed in the automatic deceleration mode, if the operator depresses the auto-deceleration button D again to return into the normal driving mode, the motor 4 forwardly rotates to have the output pulley 6 rotate so as to open the speed governor 9 until the initial speed governor opening is restored.

Figure 7:
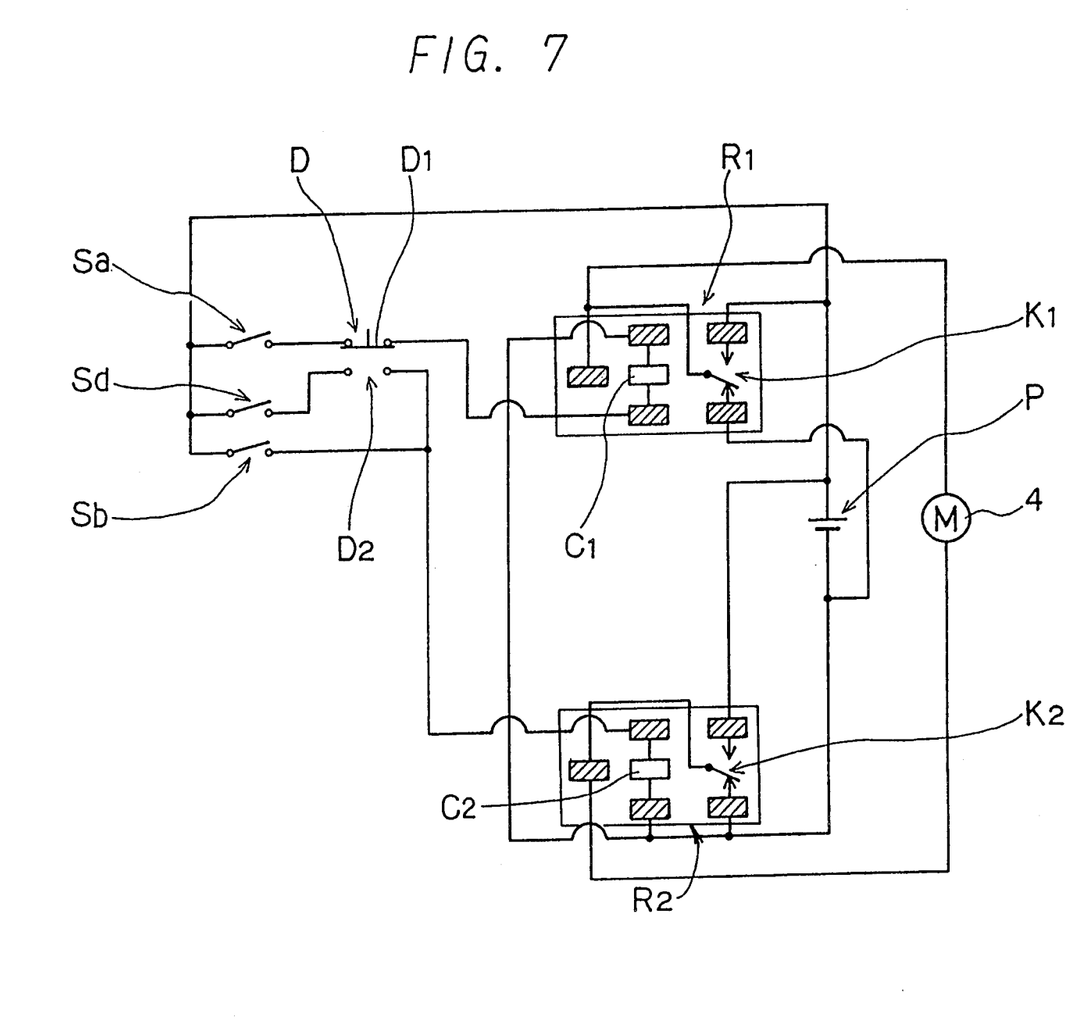
FIG. 7 is a circuit diagram showing an embodiment of a control circuit of an actuator according to the present invention.

The ON-OFF control over the motor 4 described above can be performed by means of an electric circuit, for example, as shown in FIG. 7. In FIG. 7, an acceleration switch Sa is composed of the electrically conductive portion 37 and the contact point 45a of the forward terminal 45 shown in FIGS. 4 to 6 and is turned n when the rotation angle of the operation dial 44 becomes larger than that of the output pulley 6, while on the other hand a deceleration switch Sb is composed of the electric conductive portion 37 and the contact point 46a of the backward terminal 46 shown in FIGS. 4 to 6 and is turned on when the rotation angle of the operation dial 44 becomes smaller than that of the output pulley 6. A auto-deceleration switch Sd is turned on when the rotational angle of the output pulley 6 is larger than the predetermined angle at which the contact point 48a of the deceleration terminal 48 is positioned while turned off when it is as same as or smaller than that predetermined angle, without depending on the rotation angle of the operation dial 44. The auto-deceleration button D is a change-over switch wherein depressing it once changes over the contact to a first contact point, while depressing it again changes over the contact to a second contact point.

Further, in FIG. 7 output contact points $K_1$ and $K_2$ of two relays $R_1$ and $R_2$ are provided between the motor 4 and a dc power source P. When a coil $C_1$ of the relay $R_1$ is excited, the motor 4 revolves forwardly, while in contrast when the relay $R_2$ conducts, the motor revolves backwardly. When both the contact points $K_1$ and $K_2$ are opened, a short-circuit dynamic braking effect works so as not to revolve the motor 4 even if both the relays $R_1$ and $R_2$ are erroneously excited. The acceleration switch Sa and a first contact point $D_1$ of the auto-deceleration button D are serially connected to each other and inserted between the coil $C_1$ of the first relay $R_1$ and the dc power source P. On the other hand, the deceleration switch Sb is inserted between the coil $C_2$ of the second relay $R_2$ and the dc power source P. In addition, the auto-deceleration switch Sd and the second contact point $D_2$ of the auto-deceleration button D are serially connected to each other and further connected to the deceleration switch Sb in parallel.

In the above circuit arrangement, when the auto-deceleration button D is not depressed, turning on the acceleration switch Sa causes the first relay $R_1$ to work to revolve the motor 4 forwardly thereby increasing the rotating speed of the engine, while on the other hand turning it off causes the increased rotating speed to be maintained. In turn, turning on the deceleration switch Sb causes the second relay $R_2$ to work to revolve the motor 4 backwardly thereby decreasing the rotating speed of the engine, while on the other hand turning it off causes the decreased rotating speed to be maintained.

When the auto-deceleration button D is depressed, the first contact point $D_1$ serially connected to the acceleration switch Sa is opened so as to revolve the motor 4 backwardly until the auto-deceleration switch Sd is turned off, without regarding the state of the acceleration switch Sa and that of the deceleration switch Sb. If the auto-deceleration switch Sd is turned off, the auto-decelerated rotating speed of the engine is maintained. In turn, when the auto-deceleration button D is depressed again, the second contact point $D_2$ is made open while the first contact point $D_1$ close, thereby returning into the normal driving mode.

As described above, the present actuator can be mechanically controlled with barely employing an electronic circuit.

As has been described, the actuator of the present invention is so arranged that the driving part and control part thereof are coaxially integrated with each other, and is mechanically controllable without employing a complicated electronic circuit. Hence, the present actuator becomes compact and simplified, which contributes to a great reduction in the production cost therefor. In addition, the present actuator can be mounted on a machine body very easily with simplified maintenance therefor.

Though several embodiments of the present invention are described above, it is to be understood that mentioned and various changes and modifications may be made in the invention without departing from the spirit and scope thereof.

What is claimed is:

1. An actuator for accelerator comprising:
   (a) a casing;
   (b) a driving part comprising a reversibly revolvable motor disposed in the casing, a speed reducer for reducing revolution of the motor, and an output pulley, connected to the speed reducer, for winding up or letting out a control cable; and
   (c) a control part comprising an operation part, and a control mechanism for controlling the revolution of the motor depending on a deviation between a position of the operation part and a position of the output pulley, wherein the driving part and the control part are integrally coaxially connected to each other.

2. The actuator of claim 1, wherein the driving part comprises the motor, a first speed reducer connected to an output shaft of the motor, a second speed reducer connected to an output part of the first decelerator, and the output pulley disposed in an output part of the second speed reducer.

3. The actuator of claim 2, wherein the second decelerator is a sun and planet gear decelerator comprising a sun gear connected to the output part of the first decelerator, a plurality of planetary gears disposed around and engaged with the sun gear, and an internal gear circumferentially engaged with the planetary gears and integrated with a lower portion of the output pulley,
   a shaft of each of the planetary gears being supported at its lower end by the casing while being journalled at its upper end by a bearing member;
   the bearing member being free from any of the members other than the shaft of the planetary gear.

4. The actuator of claim 1, wherein the control part comprises a board mounted on its lower face with a terminal for forward revolution of the motor and a terminal for backward revolution thereof, an operation shaft, projecting from the board, for rotating the board, and an electrode plate fixed to the output shaft of the second decelerator so as to face opposite to a bottom face of the board,
   the board and the electrode plate being disposed in the control mechanism so as to make the two terminals being slidably contacted with the electrode plate;
   the output shaft of the second decelerator being loosely fitted into a hole formed in the center of the bottom face of the board.

5. The actuator of claim 4, wherein mechanism is arranged such that a common terminal is secured to the electrode plate so as to allow the electrode plate to be conducted by way of a conductive wire and the common terminal.

6. The actuator of claim 4, wherein the control mechanism has an insulating plate disposed on the board thereby separating the upper compartment of the board from the lower compartment thereof, on which insulating plate are provided wires respectively connecting to the terminal for forward revolution of the motor and the terminal for backward revolution thereof.

* * * * *